United States Patent
Pons Y Moll et al.

(10) Patent No.: US 10,961,150 B2
(45) Date of Patent: Mar. 30, 2021

(54) SIZING COMPOSITION FOR MINERAL FIBERS AND RESULTING PRODUCTS

(71) Applicant: SAINT-GOBAIN ISOVER, Courbevoie (FR)

(72) Inventors: Olivier Pons Y Moll, Agnetz (FR); Boris Jaffrennou, Paris (FR); Jerome Douce, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 15/670,446

(22) Filed: Aug. 7, 2017

(65) Prior Publication Data
US 2017/0334776 A1 Nov. 23, 2017

Related U.S. Application Data

(63) Continuation of application No. 12/937,307, filed as application No. PCT/FR2009/050654 on Apr. 10, 2009.

(30) Foreign Application Priority Data

Apr. 11, 2008 (FR) .................................... 08 02017

(51) Int. Cl.
| | | |
|---|---|---|
| C03C 25/34 | (2006.01) | |
| C03C 25/26 | (2018.01) | |
| C08J 5/04 | (2006.01) | |
| C08J 5/24 | (2006.01) | |
| C09J 161/06 | (2006.01) | |
| C09J 161/14 | (2006.01) | |
| C09J 161/34 | (2006.01) | |
| C08K 5/151 | (2006.01) | |
| C08K 5/17 | (2006.01) | |

(52) U.S. Cl.
CPC .............. *C03C 25/34* (2013.01); *C03C 25/26* (2013.01); *C08J 5/043* (2013.01); *C08J 5/044* (2013.01); *C08J 5/24* (2013.01); *C09J 161/06* (2013.01); *C09J 161/14* (2013.01); *C09J 161/34* (2013.01); *C08J 2361/04* (2013.01); *C08K 5/151* (2013.01); *C08K 5/17* (2013.01); *C08L 2666/26* (2013.01)

(58) Field of Classification Search
CPC ................................ C09J 161/14; C09C 25/34
See application file for complete search history.

(56) References Cited

U.S. PATENT DOCUMENTS

| | | | |
|---|---|---|---|
| 3,285,801 A | 11/1966 | Sarjeant | |
| 3,597,375 A * | 8/1971 | Ludwig et al. | C08G 8/12 156/335 |
| 3,790,442 A | 2/1974 | Ashall | |
| 3,862,060 A | 1/1975 | Anderson et al. | |
| 4,169,077 A | 9/1979 | Hartman | |
| 4,339,361 A | 7/1982 | Macpherson et al. | |
| 4,414,379 A | 11/1983 | Koyama et al. | |
| 4,537,941 A | 8/1985 | Kambanis et al. | |
| 4,757,108 A | 7/1988 | Walisser | |
| 5,270,434 A | 12/1993 | Tetart et al. | |
| 5,300,593 A | 4/1994 | Gardziella et al. | |
| 5,340,903 A | 8/1994 | Tetart et al. | |
| 5,358,748 A | 10/1994 | Matthews et al. | |
| 5,578,371 A | 11/1996 | Taylor et al. | |
| 5,637,658 A | 6/1997 | Teodorczyk | |
| 5,705,537 A | 1/1998 | Hartman et al. | |
| 5,795,934 A | 8/1998 | Parks | |
| 5,866,642 A | 2/1999 | Mcvay et al. | |
| 5,919,528 A * | 7/1999 | Huijs | C03C 25/34 427/389.8 |
| 5,952,440 A | 9/1999 | Walisser et al. | |
| 6,090,883 A | 7/2000 | Fouquay et al. | |
| 6,179,885 B1 | 1/2001 | Mcatee | |
| 6,342,271 B1 | 1/2002 | Lericque et al. | |
| 6,399,719 B1 | 6/2002 | Dopico et al. | |
| 6,632,912 B2 | 10/2003 | Sudan | |
| 6,646,094 B1 | 11/2003 | Malhotra et al. | |
| 6,706,808 B2 | 3/2004 | Delaviz et al. | |
| 6,706,809 B2 | 3/2004 | Tutin et al. | |
| 6,706,845 B2 | 3/2004 | Ingram et al. | |
| 6,893,579 B2 | 5/2005 | Espiard et al. | |
| 7,671,097 B2 | 3/2010 | Boyer et al. | |
| 8,034,415 B2 | 10/2011 | Huenig et al. | |
| 2001/0009945 A1 | 7/2001 | Delaviz et al. | |
| 2003/0045665 A1 | 3/2003 | Sudan | |
| 2004/0131874 A1 | 7/2004 | Tutin et al. | |
| 2006/0128888 A1 | 6/2006 | Tetart | |
| 2009/0149624 A1 | 6/2009 | Pullichola et al. | |

(Continued)

FOREIGN PATENT DOCUMENTS

| | | |
|---|---|---|
| EP | 0 373 978 A | 6/1990 |
| GB | 1 284 568 | 8/1972 |

(Continued)

OTHER PUBLICATIONS

International Search Report dated Nov. 19, 2009 in PCT/FR09/050654 filed Apr. 10, 2009.

*Primary Examiner* — Liam J Heincer
(74) *Attorney, Agent, or Firm* — Pillsbury Winthrop Shaw Pittman LLP

(57) ABSTRACT

The present invention relates to a sizing composition for mineral fibers, especially glass fibers or rock fibers, containing a liquid phenolic resin having a free formaldehyde content, expressed with respect to the total weight of liquid, of 0.1% or less and an extender.

Preferably, the liquid phenolic resin is mainly composed of phenol-formaldehyde and phenol-formaldehyde-amine condensates and has a water dilutability, at 20° C., at least equal to 1000%.

Another subject of the present invention is the insulating products based on mineral fibers treated by said sizing composition.

13 Claims, No Drawings

(56) References Cited

U.S. PATENT DOCUMENTS

| | | |
|---|---|---|
| 2009/0181260 A1 | 7/2009 | Verma et al. |
| 2010/0001225 A1 | 1/2010 | Gignoux et al. |
| 2010/0119824 A1 | 5/2010 | Gignoux et al. |
| 2011/0111226 A1 | 5/2011 | Pons Y Moll et al. |

FOREIGN PATENT DOCUMENTS

| | | | | |
|---|---|---|---|---|
| WO | 98/53001 | 11/1998 | | |
| WO | 00/78836 | 12/2000 | | |
| WO | 2006/132785 | 12/2006 | | |
| WO | WO-2006136614 A1 * | 12/2006 | ............ | C03C 25/26 |
| WO | 2007/060237 | 5/2007 | | |
| WO | 2008/043960 | 4/2008 | | |
| WO | 2008/043961 | 4/2008 | | |

* cited by examiner

SIZING COMPOSITION FOR MINERAL FIBERS AND RESULTING PRODUCTS

The invention relates to a sizing composition for mineral fibers, especially glass fibers or rock fibers, which has a low content of free formaldehyde. The sizing composition comprises a resin obtained by the condensation of phenol, formaldehyde and an amine in the presence of a basic catalyst, and an extender.

The invention also relates to the insulating products based on mineral fibers treated by said sizing composition.

The insulating products based on mineral fibers may be formed from fibers obtained by various processes, for example using the known technique of internal or external centrifugal fiberizing.

Internal centrifugation consists in introducing molten material (in general glass or rock) into a spinner that has a multitude of small holes, the material being projected against the peripheral wall of the spinner under the action of the centrifugal force and escaping therefrom in the form of filaments. On leaving the spinner, the filaments are attenuated and entrained by a high-velocity high-temperature gas stream to a receiving member in order to form a web of fibers.

As for external centrifugation, this consists in pouring the molten material onto the outer peripheral surface of rotary members known as rotors, from which the molten material is ejected under the action of the centrifugal force. Means for attenuating via a gas stream and for collecting on a receiving member are also provided.

To assemble the fibers together and provide the web with cohesion, the fibers, on leaving the spinner, are sprayed with a sizing composition containing a thermosetting resin. The web of fibers coated with the size undergoes a heat treatment (at a temperature generally above 100° C.) so as to polycondense the resin and thus obtain a thermal and/or acoustic insulation product having specific properties, especially dimensional stability, tensile strength, thickness recovery after compression, and uniform color.

The sizing composition is usually sprayed onto the fibers. Generally, the sizing composition contains the resin, which customarily takes the form of an aqueous solution, additives, such as urea, silanes, mineral oils, aqueous ammonia and a polycondensation catalyst, and water.

The properties of the sizing composition depend largely on the characteristics of the resin. From the standpoint of the application, it is necessary for the sizing composition to have good sprayability and be able to be deposited on the surface of the fibers so as to bond them effectively. The sprayability is directly related to the capability that the resin possesses of being able to be diluted in a large amount of water and to remain stable over time.

The dilution capability is characterized by the "dilutability", which is defined as the volume of deionized water that it is possible, at a given temperature, to add to a unit volume of the aqueous resin solution before the appearance of permanent cloudiness. In general, a resin is considered to be able to be used as a size when its dilutability at 20° C. is 1000% or higher.

The sizing composition is generally prepared at the time of use by mixing the resin and the abovementioned additives. It is important that the resin remains stable for a given period of time before being used in the sizing composition, in particular for at least 8 days at a temperature of around 12 to 18° C. and that its dilutability at the end of this period is, at 20° C., 1000% or higher, preferably 2000% or higher (infinite dilutability).

Furthermore, the sizing compositions are subject to strict regulations which mean that the resin must contain—and generate during the sizing operation or subsequently during the curing of the insulating product—as few as possible compounds considered to be harmful to human health or to the environment.

The thermosetting resins most commonly used in sizing compositions are phenolic resins belonging to the family of resols. Apart from their good crosslinkability under the aforementioned thermal conditions, these resins are very soluble in water, possess good affinity for mineral fibers, especially glass fibers, and are relatively inexpensive.

These resins are obtained by the condensation of phenol and formaldehyde, in the presence of a basic catalyst, in a formaldehyde/phenol molar ratio generally greater than 1 so as to promote the reaction between the phenol and the formaldehyde and to reduce the residual phenol content in the resin.

To reduce the amount of residual formaldehyde, it is known to add a sufficient amount of urea to the resin, the urea reacting with the free formaldehyde, forming urea-formaldehyde condensates (see EP 0 148 050 A1). The resin obtained contains phenol-formaldehyde and urea-formaldehyde condensates, has a free formaldehyde and free phenol content, expressed with respect to the total weight of liquid, of 3% and 0.5%, respectively, or less, and a water dilutability of at least 1000%.

Although the amount of residual phenol is acceptable, the amount of residual formaldehyde is however too high to meet the current regulatory constraints.

Moreover, it has been found that the resin is not stable under the conditions of the heat treatment to which the sized fibers are subjected in order for the resin to crosslink and effectively bond the fibers in the final insulating product. At the temperatures customarily used in the oven, generally above 100° C., the urea-formaldehyde condensates are degraded and release formaldehyde, which increases the undesirable gas emissions into the atmosphere. Formaldehyde may also be released from the end product during its use as thermal and/or acoustic insulation, under the effect of temperature variations and also hygrometric variations linked to climatic cycles.

EP 0 480 778 A1 has proposed to substitute part of the urea with an amine, which reacts with the free phenol and the free formaldehyde via the Mannich reaction to form a condensation product having improved thermal stability. The free phenol and free formaldehyde contents of this resin are 0.20% or less and 3% or less, respectively.

The objective of the present invention is to provide a sizing composition capable of being sprayed onto mineral fibers which comprises a liquid phenolic resin that has a low content of free formaldehyde and an extender.

The term "extender" is understood here to mean an organic filler that is soluble or dispersible in the aqueous sizing composition, i.e. which may be distributed or is in the form of a dispersion or an emulsion.

One subject of the invention is, more generally, a resin composition that comprises a liquid phenolic resin having a low content of free formaldehyde and an extender. This resin composition is intended, in particular, to be incorporated into the constitution of the aforementioned sizing composition.

Another subject of the invention relates to the thermal and/or acoustic insulation products obtained from mineral fibers sized with the aforementioned sizing composition.

The liquid resin that is incorporated into the constitution of the sizing composition according to the invention has a free formaldehyde content, expressed with respect to the total weight of liquid, of 0.1% or less, preferably of 0.05% or less.

The free phenol content of the resin is, expressed with respect to the total weight of liquid, 0.5% or less, preferably 0.4% or less.

Advantageously, the resin is a liquid resin which mainly contains phenol-formaldehyde (P-F) and phenol-formaldehyde-amine (P-F-A) condensates. It is understood here that the "phenol" part, denoted by P, of the condensates may be composed of (i) phenol, or (ii) phenol substituted by at least one functional group (such as halo-, nitro-, alkyl-), or (iii) an optionally substituted phenol group borne by a long-chain molecule, or (iv) a mixture of the aforementioned compounds (i), (ii), (iii).

The resin has a dilutability, measured at 20° C., at least equal to 1000%, preferably 1200% or higher and advantageously 1400% or higher.

The resin is thermally stable since it is free of urea-formaldehyde (U-F) condensates known for their aptitude to degrade under the effect of temperature. As for the P-F-A condensates, these are stable under the aforementioned conditions, notably they generate little formaldehyde, in particular during aging of the final insulating product.

The resin as defined above is obtained according to a process that consists in reacting a phenol as defined previously, preferably phenol, and formaldehyde in the presence of a basic catalyst, in a formaldehyde/phenol molar ratio greater than 1, in cooling the reaction mixture and in introducing into said reaction mixture, during the cooling, an amine that reacts with the free formaldehyde and the free phenol via the Mannich reaction.

As soon as the amine is introduced the cooling is interrupted and the reaction mixture is maintained at the introduction temperature for a time that varies from 10 to 120 minutes, and after the cooling an acid is added in a sufficient amount so that the pH of the resin is less than 7.

Preferably, the phenol and the formaldehyde are made to react in a formaldehyde/phenol molar ratio of between 2 and 4, or advantageously less than or equal to 3, to a degree of phenol conversion of greater than or equal to 93%, and cooling of the reaction mixture is started. The cooling takes place at a stage in the condensation that corresponds to a resin that can still be diluted with water (dilutability greater than 1000%).

The expression "degree of phenol conversion" is understood to mean the percentage of phenol that has participated in the condensation reaction with the formaldehyde relative to the starting phenol content.

The amine is added progressively during the cooling since the reaction between phenol and formaldehyde is exothermic, and the temperature at the moment of addition of the amine is maintained over the time mentioned above, while taking measures to ensure that the dilutability of the resin remains at least equal to 1000%.

The amine is chosen from amines that can react with formaldehyde and phenol to form a Mannich base. As examples, mention may be made of alkanolamines, in particular monoethanolamine and diethanolamine, and cyclic amines, in particular piperidine, piperazine, and morpholine. Monoethanolamine and diethanolamine are preferred.

The amine is introduced right from the start of the cooling, at a temperature that may vary from 50 to 65° C., preferably of about 60° C.

The phase during which the temperature is maintained allows the amine to be reacted with almost all of the formaldehyde present in the reaction medium, and consequently allows the free formaldehyde content in the final resin to be lowered down to a value of 0.1% or less.

By maintaining the mixture at the abovementioned temperature, it is also possible to reduce the free phenol content in the resin, in particular when the latter is obtained with a formaldehyde/phenol molar ratio of less than 3. The free phenol content in the resin is thus 0.5% or less.

The preparation of the resin takes place under a temperature cycle, which comprises three phases: a heating phase; a first temperature hold; and a cooling phase.

In the first phase, formaldehyde and phenol are made to react in the presence of a basic catalyst, while progressively heating to a temperature between 60 and 75° C., preferably about 70° C. The formaldehyde/phenol molar ratio is greater than 1, preferably varies from 2 to 4 and is advantageously equal to 3 or less.

The catalyst may be chosen from catalysts known to those skilled in the art, for example triethylamine, lime (CaO) and alkali or alkaline-earth metal hydroxides, for example sodium hydroxide, potassium hydroxide, calcium hydroxide or barium hydroxide. Sodium hydroxide is preferred.

The amount of catalyst varies from 2 to 15%, preferably 5 to 9% and advantageously 6 to 8% by weight relative to the initial weight of phenol.

In the second phase, the temperature of the reaction mixture, which is reached after heating the reaction mixture (end of the first phase), is maintained until the degree of phenol conversion is at least equal to 93%.

The third phase is a cooling phase during which the amine is introduced into the reaction mixture so as to start the reaction with the residual formaldehyde and the residual phenol, and thus to form the P-F-A condensates.

The addition of the amine takes place progressively owing to the exothermic character of the reaction, as indicated above, and may for example be carried out at a rate of from 1 to 5%, preferably 2 to 4%, by weight of the total amount of amine per minute.

The amount of amine, in particular of alkanolamine, is added in an amount of 0.2 to 0.7 mol, preferably 0.25 to 0.5 mol, of amine per mole of starting phenol.

The duration of the amine addition may vary from 10 to 120 minutes, preferably 20 to 100 minutes and advantageously 25 to 50 minutes.

Preferably, the addition of the amine is carried out at a temperature between 50 and 65° C. and advantageously of about 60° C.

After the amine has been added, a temperature hold is effected by maintaining the temperature at the end of the introduction for 10 to 120 minutes, preferably at least 15 minutes, so as to continue the condensation reaction of the formaldehyde and the phenol with the amine until a more advanced stage and further reduce the amount of free formaldehyde and free phenol, the dilutability of the resin, measured at 20° C., having to be maintained at least at 1000%.

After the P-F-A condensates have been formed, the reaction mixture is cooled so that its temperature reaches about 20 to 25° C. and is neutralized so as to stop the condensation reactions.

The reaction mixture is neutralized by adding an acid until a pH of less than 7, preferably less than 6 and advantageously above 4 and better still of around 5 is obtained. The acid is chosen from sulfuric acid, sulfamic acid, phosphoric acid and boric acid. Sulfuric acid and sulfamic acid are preferred.

The extender is chosen, in particular, from carbohydrates, lignin derivatives, especially lignosulfonates such as ammonium lignosulfonate (ALS) or sodium lignosulfonate, animal or plant, especially soybean, proteins and mixtures of these compounds.

As examples of carbohydrates, mention may be made of monosaccharides such as erythrose, threose, ribose, arabinose, xylose, lyxose, glucose, allose, altrose, mannose, gulose, idose, galactose, talose, psicose, fructose, sorbose and tagatose, oligosaccharides such as lactose, maltose, sucrose, cellobiose, trehalose, raffinose, gentianose, melibiose and stachyose, and polysaccharides such as starches, especially corn, potato, tapioca and wheat starches, which starches may or may not be modified, celluloses, gums such as guar gum and xanthan gum, alginates and pectins.

Water-soluble carbohydrates are preferred.

The sizing composition may also comprise 0 to 40 parts of urea per 100 parts by dry weight of the mixture constituted by the resin and the urea.

These extenders may, where appropriate, be based on by-products resulting from industrial or agricultural, in particular agri-food processes, or from other waste products. These materials have the advantage of being available through different channels to the chemical constituents generally used in the synthesis of phenolic resins, which makes the preparation of the composition according to the invention less sensitive to the fluctuations in the production of conventional raw materials.

In the sizing composition, the content of extender varies from 0.1 to 40 parts by weight per 100 parts by dry weight of liquid resin, preferably is 20 parts or less, for example from 3 to 20 parts and in particular is 15 parts or less.

Generally, the sizing composition also comprises the following additives, per 100 parts by dry weight of resin and where appropriate of urea:
  0 to 10 parts of a polycondensation catalyst, for example ammonium sulfate, preferably less than 7 parts;
  0 to 2 parts of silane, in particular an aminosilane;
  0 to 20 parts of oil, preferably 6 to 15 parts; and
  0 to 20 parts of aqueous ammonia (20 wt % solution), preferably less than 12 parts.

The role of the additives is known and is briefly recalled: the urea makes it possible to adjust the gel time of the sizing composition in order to prevent any pregelling problems; the ammonium sulfate serves as a polycondensation catalyst (in the hot oven) after the sizing composition has been sprayed onto the fibers; the silane is a coupling agent for coupling between the fibers and the resin and also acts as an anti-ageing agent; the oils are hydrophobic anti-dust agents; the aqueous ammonia acts, when cold, as a polycondensation retarder.

The examples that follow allow the invention to be illustrated without however limiting it.

EXAMPLE 1

Introduced into a 2-liter reactor topped with a condenser and equipped with a stirring system were 378 g of phenol (4 mol) and 809 g of formaldehyde (10 mol) as a 37% aqueous solution (formaldehyde/phenol molar ratio equal to 2.5) and the mixture was heated at 45° C. with stirring.

52.7 g of sodium hydroxide as a 50% aqueous solution (i.e. 7% by weight relative to the phenol) were regularly added over 30 minutes, the temperature was then progressively raised to 70° C. over 30 minutes, and this temperature was maintained for 80 minutes so as to reach a degree of phenol conversion equal to 93%.

Next, the temperature was reduced to 60° C. over 30 minutes and at the same time 75.3 g of monoethanolamine (1.2 mol) were introduced in a regular manner into the reaction mixture. The temperature was maintained at 60° C. for 15 minutes, the mixture was cooled down to about 25° C. over 30 minutes, and sulfamic acid as a 15% solution was added over 60 minutes until the pH was equal to 5.0.

The resin obtained had the appearance of a clear aqueous composition: it had a free formaldehyde content equal to 0.05%, a free phenol content equal to 0.2% (the contents being expressed with respect to the total weight of liquid) and a dilutability greater than 2000%.

The solids content of the liquid resin, by weight, was adjusted to 50% with water, and urea (20 parts by weight per 80 parts by dry weight of the liquid resin) was added.

A sizing composition was prepared by mixing 100 parts by dry weight of the aforementioned mixture of resin and urea, 7 parts by weight of molasses, 3 parts of ammonium sulfate, 1 part of silane (Silquest® A-1100 sold by OSI) and 8 parts of a mineral oil.

This sizing composition was used to fabricate an insulating product based on mineral wool. Conventionally, the sizing composition was sprayed onto glass fibers at the outlet from the fiberizing device in an amount of 4.5% by dry weight of size relative to the weight of the fibers. The sized fibers were collected on a belt conveyor where they formed a glass wool blanket, which was then subjected to a heat treatment in an oven in order to obtain a minimum temperature of 200° C. in the middle of the product.

The final insulating product had a nominal thickness of 200 mm and a nominal density of 11 kg/m³. It had mechanical properties in terms of tensile strength, thickness recovery and water absorption capacity that were identical to those of a product fabricated under the same conditions with a control sizing composition that did not contain an extender.

EXAMPLE 2

A liquid resin was prepared under the conditions from example 1.

A mixture containing 80 parts by dry weight of the liquid resin and parts by weight of urea was prepared.

A sizing composition was prepared by mixing 100 parts (by dry weight) of the aforementioned mixture of resin and urea, 5 parts by weight of a dextrin derived from corn starch, 3 parts of ammonium sulfate, 0.75 part of silane (Silquest® A-1100 sold by OSI) and 9.5 parts of a mineral oil.

The dextrin derived from corn starch had a weight-average molecular weight equal to 3510 and a dextrose equivalent (DE) equal to 30 (Roclys® C30725 sold by Roquette Freres; example 2a) or a weight-average molecular weight equal to 1850 and a dextrose equivalent (DE) equal to 30 (Tackidex® 30L75 sold by Roquette Freres; example 2b).

Conventionally, the dextrose equivalent DE is defined by the following equation:

$$DE = 100 \times \left( \frac{\text{number of glycoside bonds broken}}{\text{number of glycoside bonds in the initial starch}} \right)$$

This sizing composition was used under the conditions of example 1 to fabricate an insulating product based on mineral wool having a nominal thickness of 80 mm and a nominal density of 11 kg/m³.

Also fabricated under the same conditions was an insulating product (Reference) in which the sizing composition did not contain an extender.

The following parameters were measured on the insulating products obtained:
the thickness recovery after 24 hours under compression with a compression ratio (defined as being the ratio of the nominal thickness to the thickness under compress) equal to 5/1. The thickness recovery is the ratio of the thickness measured to the nominal thickness, expressed in %; it makes it possible to evaluate the good dimensional behavior of the product; and
the tensile strength according to the ASTM C 686-71T standard on a specimen cut from the insulating product by stamping. The specimen had the shape of a torus having a length of 122 mm, a width of 46 mm, a radius of curvature of the cut at the outer edge equal to 38 mm and a radius of curvature of the cut at the inner edge equal to 12.5 mm.

The specimen was placed between two cylindrical mandrels of a test machine, one of which was mobile and moved at a constant speed. The breaking force F (in grams Force, gF) of the specimen was measured and the tensile strength was calculated from the ratio of the breaking force F to the mass of the specimen, expressed in gF/g.

The tensile strength was measured after the fabrication (TS fab.) and after an accelerated ageing in an autoclave at a temperature of 105° C. under 100% relative humidity for 15 minutes (TS15).

The measurements are collated in table 1.

EXAMPLE 3

A sizing composition was prepared under the conditions of example 2 but modified in that the dextrin derived from a corn starch was replaced by a soybean protein hydrolyzate (Soyad® 12UT sold by Hercules).

The sizing composition was used to fabricate an insulating product based on mineral wool under the same conditions as example 2.

The thickness recovery and tensile strength measurements are given in table 1.

TABLE 1

|  | Ex. 2a | Ex. 2b | Ex. 3 | Reference |
|---|---|---|---|---|
| Thickness recovery (%) | 151 | 151 | 150 | 149 |
| Tensile strength (gF/g) |  |  |  |  |
| TS fab. | 337 | 327 | 360 | 297 |
| TS15 | 319 | 318 | 347 | 257 |
| loss (%) | 5.3 | 2.7 | 3.6 | 13.4 |

The presence of an extender in examples 2 and 3 improves the tensile strength of the products and makes it possible to retain a thickness recovery comparable to that of the reference product without extender.

The invention claimed is:

1. An insulation product, comprising:
mineral fibers sized with a sizing composition comprising a liquid phenolic resin having a free formaldehyde content, expressed with respect to the total weight of liquid, of not more than 0.1% and 3 to 12 parts by weight per 100 parts by dry weight of liquid resin of an extender,
wherein the liquid phenolic resin consists essentially of phenol-formaldehyde and phenol-formaldehyde-alkanolamine condensates and free of urea-formaldehyde condensates, and
wherein the only extender used in the sizing composition is a dextrin derived from starch, and
wherein the sizing composition is free of liquid ammonia as additive.

2. The insulation product of claim 1, wherein the liquid phenolic resin has a free phenol content, expressed with respect to the total weight of liquid, of 0.5% or less.

3. The insulation product of claim 1, wherein the liquid phenolic resin has: a free formaldehyde content, expressed with respect to the total weight of liquid, of 0.05% or less; a free phenol content, expressed with respect to the total weight of liquid, of less than 0.4%; and a water dilutability, at 20° C., of 1000% or higher.

4. The insulation product of claim 1, wherein the alkanolamine is monoethanolamine.

5. The insulation product of claim 1, wherein the alkanolamine is diethanolamine.

6. The insulation product of claim 1, wherein the sizing composition further comprises:
0 to 40 parts of urea per 100 parts by dry weight of the mixture constituted by the liquid phenolic resin and the urea.

7. The insulation product of claim 1, wherein a content of extender is from 3 to 10 parts by weight per 100 parts by dry weight of liquid phenolic resin.

8. The insulation product of claim 1, wherein the sizing composition further comprises the following additives, per 100 parts by dry weight of phenolic liquid resin and optionally of urea:
from 0 to 10 parts of a catalyst;
from 0 to 2 parts of silane;
from 0 to 20 parts of oil.

9. The insulation product of claim 1, which is a thermal and/or acoustic insulation product.

10. The insulation product of claim 1, wherein the mineral fibers are glass fibers.

11. The insulation product of claim 1, wherein the mineral fibers are rock fibers.

12. An insulation product, comprising:
mineral fibers sized with a sizing composition comprising a liquid phenolic resin having a free formaldehyde content, expressed with respect to the total weight of liquid, of not more than 0.1% and 3 to 12 parts by weight per 100 parts by dry weight of liquid resin of an extender,
wherein the liquid phenolic resin consists essentially of phenol-formaldehyde and phenol-formaldehyde-alkanolamine condensates, and
wherein the only extender used in the sizing composition is a dextrin derived from starch, and
wherein the sizing composition is free of liquid ammonia as additive.

13. The insulation product of claim 12, wherein a content of extender is from 3 to 10 parts by weight per 100 parts by dry weight of liquid phenolic resin.

* * * * *